(12) United States Patent
Clarkson et al.

(10) Patent No.: US 7,876,838 B2
(45) Date of Patent: Jan. 25, 2011

(54) LOW COMPLEXITY MULTI-CHANNEL MODULATION METHOD AND APPARATUS

(76) Inventors: Ian Vaughan Lyndon Clarkson, 1 Barkata St., The Gap, Qld, 4061 (AU); Iain Bruce Collings, 7/37 Johnson St., Chatswood, NSW 2067 (AU)

( * ) Notice: Subject to any disclaimer, the term of this patent is extended or adjusted under 35 U.S.C. 154(b) by 1593 days.

(21) Appl. No.: 10/869,066

(22) Filed: Jun. 17, 2004

(65) Prior Publication Data

US 2005/0047323 A1    Mar. 3, 2005

Related U.S. Application Data

(60) Provisional application No. 60/479,499, filed on Jun. 19, 2003.

(51) Int. Cl.
*H04K 1/10*     (2006.01)

(52) U.S. Cl. .................. 375/260; 375/316; 375/265; 375/278; 375/341

(58) Field of Classification Search ............... 375/265, 375/260; 358/426.12; 708/404
See application file for complete search history.

(56) References Cited

U.S. PATENT DOCUMENTS

| | | | | | |
|---|---|---|---|---|---|
| 4,533,957 | A | * | 8/1985 | Iinuma | 358/426.12 |
| 5,982,818 | A | * | 11/1999 | Krueger et al. | 375/265 |
| 6,157,938 | A | * | 12/2000 | Wu et al. | 708/404 |
| 2006/0067414 | A1 | * | 3/2006 | Vadde | 375/260 |

OTHER PUBLICATIONS

"A Low-Complexity Latice-Based Low-PAR Transmission Scheme for DSL Channels," to Collings et al. May 2004. (10 pages).
"Vectored Transmission for Digital Subscriber Line Systems," to Ginis et al. Jun. 2002. (20 pages).

* cited by examiner

*Primary Examiner*—Sudhanshu C Pathak
(74) *Attorney, Agent, or Firm*—Finnegan, Henderson, Farabow, Garrett & Dunner, L.L.P.

(57) ABSTRACT

A digital communications apparatus for processing a data vector includes a transmitter for communicating with a receiver across a channel having channel characteristics. A transmit vector is computed from the data vector and from values defining a basis for a transmit lattice. The transmit lattice defines a set of transmit symbols of length N and is related to an orthogonal receive lattice by the channel characteristics. The computation is performed according to an algorithm of order N complexity.

32 Claims, 4 Drawing Sheets

LOW COMPLEXITY MULTI-CHANNEL MODULATION METHOD AND APPARATUS

This application claims priority under 35 U.S.C. §119(e)(1) of Provisional Application No. 60/479,499, filed Jun. 19, 2003.

FIELD OF THE INVENTION

The present invention relates to a method and apparatus for multi-carrier modulation of digital data. The invention particularly relates to a method and apparatus for multi-carrier modulation that is of relatively low computational complexity.

BACKGROUND TO THE INVENTION

Multi-carrier modulation (MCM) digital communication schemes, such as orthogonal frequency division modulation (OFDM) for wireless communication and discrete multitone (DMT) for digital subscriber lines (DSL) are being rapidly adopted in an effort to efficiently deliver high-speed data services. Such schemes make use of recent advances in digital signal processing (DSP) technology to replace many of the functions previously performed in analog circuitry, with more efficient and robust digital implementations.

MCM is able to adequately overcome the effects of severe frequency-dependent attenuation and dispersion present on many communications links. It does this by dividing the physical channel in frequency into a large number of equally spaced subchannels. The variable attenuation present in wideband channels can be overcome by measuring the magnitude response of the subchannels using standardised test signals. If the channel is fading slowly enough, e.g. in a typical DSL channel or in a wireless channel between two slowly moving or static transceivers, the modems at each end of the line can then allocate bits adaptively to the subchannels according to the received signal to noise ratio (SNR) in order to find a compromise between bit-error rate (BER) and transmission rate. If the channel is fading more quickly then bits may be evenly allocated across subchannels. By measuring the response in each subchannel, the effects of dispersion can be overcome by applying a simple phase correction. This frequency-domain representation of the signal used for coding and decoding makes use of the fast Fourier transform (FFT) and its inverse (IFFT). Integrated circuits for performing the IFFT and FFT at sufficiently high enough rates for wideband communication have only become readily available relatively recently. The sampling rate is chosen so that frequency symmetric pairs of bins in the FFT represent the subchannels.

The existing MCM techniques commonly apply quadrature-amplitude modulation (QAM) in each subchannel. The transmitter packs data bits in blocks into FFT bins (subchannels) using QAM constellations of various sizes, according to the measured capacity, performs the IFFT, and recovers the bits from the QAM constellations in each pair of bins. A predetermined delay is inserted between each symbol to prevent intersymbol interference (ISI) caused by the channel response. This space is usually filled by prefixing the symbol with the last few samples of that symbol. This simplifies the process of synchronization in the receiver.

A problem that is encountered when implementing MCM schemes of the types described is that the time domain signals which result after the IFFT operation may exceed the linear range of the transmit amplifier so that clipping occurs. A related problem is that many MCM systems typically exhibit a large peak-to-average power ratio (PAR). Signals that exhibit a high PAR are problematical in practical systems because the digital-to-analog (DAC) and analog-to-digital converters (ADC) have only a finite range of voltages over which they can transmit and receive and only a finite resolution. If the PAR is too high then either the signalling waveforms will be frequently clipped or there will be inadequate resolution when synthesized in the DAC or sampled in the ADC. It would be desirable if an embodiment of the present invention addressed the problem of clipping discussed above.

The computational overhead involved in implementing MCM of the prior-art type described is dominated by implementation of FFT/IFFT algorithms to decode and code symbols. As is well known, these algorithms require O(N log N) arithmetic computations on a symbol of N samples. It is an object of the present invention to provide a method and apparatus for MCM that is of lower computational complexity than the prior-art FFT/IFFT based schemes and preferably while maintaining a low PAR.

SUMMARY OF THE INVENTION

According to a first aspect of the present invention there is provided a digital communications apparatus for processing a data vector, said apparatus including a transmitter for communicating with a receiver across a channel having channel characteristics, said apparatus including:

computational means for computing a transmit vector from the data vector and from values defining a basis for a transmit lattice, said transmit lattice defining a set of transmit symbols of length N and related to an orthogonal receive lattice by the channel characteristics, wherein the computational means is arranged to perform the computation according to an algorithm of order N complexity.

Preferably the apparatus is arranged to determine the channel characteristics.

According to a preferred embodiment the apparatus is arranged to calculate the values defining the basis for the transmit lattice.

The apparatus may be arranged to calculate the values defining the basis for the transmit lattice in order that the transmit symbols avoid clipping by the transmitter.

Preferably the apparatus is arranged to determine the basis for the transmit lattice from a decomposition of a channel matrix of the channel characteristics.

Preferably the apparatus is arranged to compute the receive lattice points so that they are spaced as a function of a desired bit error rate.

It is desirable that the digital communications apparatus include a means for converting binary code data into the data vector, such as a Gray-code converter.

The digital communications apparatus may in place of, or in addition to, the transmitter, include a receiver for processing a receive data vector.

In the event that the digital communications apparatus includes a receiver, and thereby comprises a modem, then the apparatus will preferably include means for computing a filtered vector from the receive data vector and values defining a basis for the orthogonal receive lattice.

Preferably the means for computing the filtered vector operates according to an algorithm of order N complexity.

Preferably the apparatus includes means for processing the filtered vector to determine a maximum-likelihood estimate of the data vector.

In a preferred embodiment the apparatus further includes a mapping means for converting elements of the maximum-likelihood estimate of the data vector to a binary code format.

The mapping means will preferably comprise a binary-to-Gray-code converter. According to a further aspect of the present invention there is provided a method for operating a processor of a digital communications apparatus to transmit digital data across a channel having channel characteristics, the method including the steps of:

calculating a basis for a transmit lattice as a function of the channel characteristics and a receive lattice having predetermined dimensions.

Preferably the method includes calculating the receive lattice as a function of a desired bit-error-rate (BER).

Preferably method includes calculating the basis for the transmit lattice in order that clipping is avoided in a transmitter operated by the digital communications apparatus.

According to a further aspect of the invention there is provided a method for operating a processor of a digital communications apparatus for transmitting digital data across a channel characterised by a channel matrix H, the method including the steps of:

a) instructing the processor to divide the digital data into N subsequences each of length $B_i$ for i=1, ..., N;

b) instructing the processor to form a data vector q from the N subsequences;

c) instructing the processor to determine a basis $U^{-1}A$ for a transmit lattice where $U^{-1}$ is an upper triangular matrix determined from a decomposition of the channel matrix and $A=\text{diag}(2^{-B1}, 2^{-B2}, \ldots, 2^{-BN})$; and d) instructing the processor to iteratively calculate a vector x of transmit signals according to the equation $$x_i = \rho_i - \sum_{j=i+1}^{N} u_{ij} x_j$$

where $\rho = Aq$

Preferably the method further includes instructing the processor to calculate $x_i$ in each iteration of step d) so that x falls within a pre-determined transmit space comprising a region of N-dimensional space.

Preferably the pre-determined region of transmit space is selected to avoid clipping.

In a preferred embodiment the method further includes steps for instructing the processor to process a receive vector y, said steps including:

e) instructing the processor to calculate a matrix R from the channel matrix H where H=QR and Q is an orthonormal matrix; and f) instructing the processor to iteratively calculate a filtered receive vector s according to the equation $$s_i = \frac{1}{r_{ii}} \mu_i - \sum_{j=1}^{i-1} r_{ji} s_j$$

where $\mu = H^T y$.

The method may further include the step of instructing the processor to calculate a maximum likelihood estimate $\hat{q}$ of q by calculating the positive remainder of the division of $\hat{p}_i$ by $2^{B_i}$ where $\hat{p}_i=\text{round}(2^{B_i} s_i/d_i)$ and "round" is a function which yields a nearest integer to its argument.

In a preferred embodiment the method further includes the step of converting the $\hat{q}$ to estimates of the digital data referred to in step a) by binary-to-Gray-code conversion.

According to a further aspect of the present invention there is provided a communications apparatus including a software or firmware product in the form of a memory device such as an integrated circuit or an optical or magnetic readable medium, containing instructions readable by a processor for implementing the above method.

Further preferred features of the present invention will be described in the following detailed description of an exemplary embodiment wherein reference will be made to a number of figures as follows.

DETAILED DESCRIPTION OF EXEMPLARY EMBODIMENTS

Figure 1:
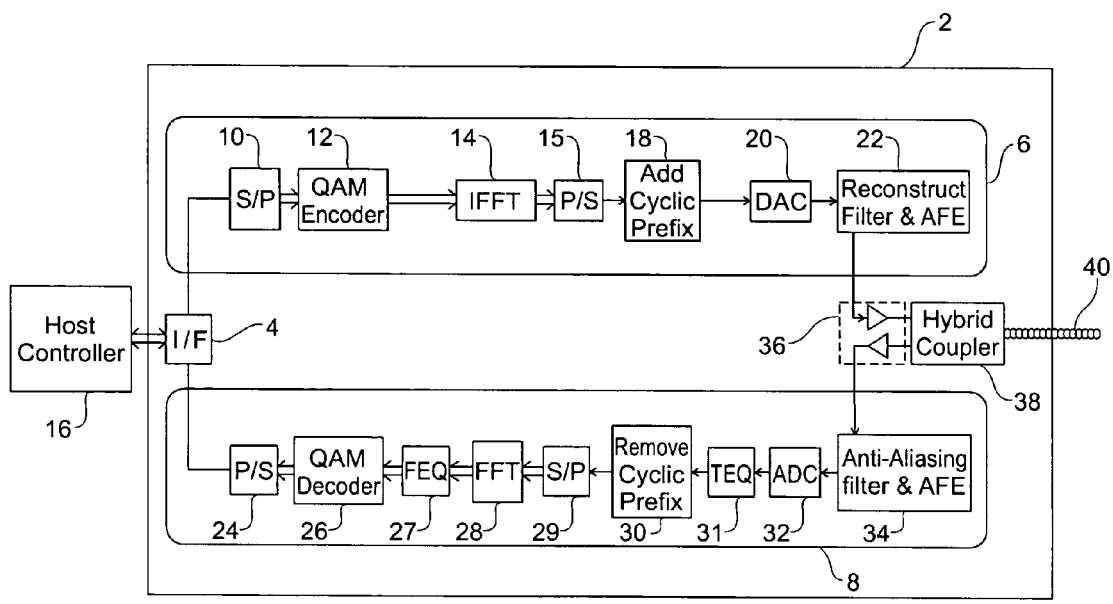
FIG. 1 is a functional block diagram of a prior art modem.

FIG. 1 is a schematic block diagram for explaining a basic prior-art discrete multi-tone modem 2 as used for asymmetric digital subscriber line (ADSL) communication. For purposes of explanation, FIG. 1 depicts a number of functional modules. It will be realised however that in practice an electronic processor executing a suitable firmware program stored in a memory device would implement many of the functional modules.

Modem 2 includes a digital interface 4 that facilitates digital transmission between a host controller 16 and transmitter 6 and receiver 8. For example the digital interface may perform an error correction function. Host controller 16 will typically comprise a personal computer or alternatively it could be a processor for controlling data traffic in an Internet service provider's central office. In use, modem 2 communicates with a remote modem across a channel comprised of conductor 40 that is typically a twisted pair of telephone wires.

Transmitter 6 includes a serial-to-parallel converter 10 for converting input data bits from digital interface 4. According to a typical DMT modulation process the DMT modulator includes a QAM encoder 12 that performs QAM encoding on the data, and produces a number N of complex sample data points. That is, the QAM encoder assigns data stored in an input bit buffer of converter 10 to each of N sub channels, typically by 2-15 bits. Here the N complex samples refer to signals in the frequency domain. IFFT unit 14 performs an IFFT on the complex samples in the frequency domain and converts them to samples in the time domain. Parallel-to-serial converter 15 converts the output from IFFT module 15 to a serial stream. Cyclic extension module 18 processes the serial stream by inserting a cyclic prefix of length related to the channel impulse response in sampling periods. The cyclic prefix occupies a so called "guard period" between signals and is inserted to avoid intersymbol interference (ISI) during symbol recovery.

Digital-to-analog converter 20 transforms the QAM encoded complex sample data, including cyclic prefix, into a data series which is conditioned by reconstruction filter and analog front end 22 to form a suitable analog signal that is delivered to twisted pair cable 40 by means of line driver amplifier 36 and hybrid coupler 38.

The reverse procedure is analogously performed in receiver 8 by means of anti-aliasing filter and analog front-end 34, analog-to-digital converter 32, equaliser 31, cyclic extension remover module 30, serial-to-parallel converter 29, FFT module 28, equaliser 27 and QAM decoder 26.

As previously mentioned, the computational overhead associated with modems of the prior-art type of FIG. 1 is concentrated in FFT unit 28 and IFFT unit 14. This is due to the fact that the algorithms implemented by those units require O(N log N) arithmetic computations on a symbol of N samples.

Another problem with prior art modems of the type exemplified in FIG. 1 is that the output from IFFT module 14 may exceed the range of DAC 20 or alternatively produce a signal that exceeds the linear range of driver amplifier 36 so that it is clipped. A preferred embodiment of the invention addresses this problem.

The present invention is developed from a theoretical framework centered on lattice theory. Put simply, a lattice can be defined in terms of a number of linearly independent basis vectors. The lattice itself is the set of all integer linear combinations of the basis vectors. Consequently, if the basis of a lattice is given by the column vectors of a basis matrix B, then the lattice is the set of all vectors of the form $B\xi$, where $\xi$ is a vector whose elements are integers. A simple property of lattices is that if $z_1$ and $z_2$ are two lattice vectors then so are their sum and difference.

The present invention is derived from the realisation that time-domain samples at the receiver may be interpreted as, and constructed so as to be, the points of an orthogonal receive lattice. The receive lattice points can be spaced at a sufficient Euclidean distance from each other so that detection is possible for a target BER. The inventors have conceived that if the characteristics of the communication channel between transmitter and receiver are known then it is possible to derive a corresponding transmit-lattice, directly related to the receive-lattice. Furthermore, if required it may be ensured that all lattice points in the transmit lattice fall within a multi-dimensional cube C dimensioned to ensure that clipping is completely avoided in the transmitter in the discrete time channel model.

Figure 2:
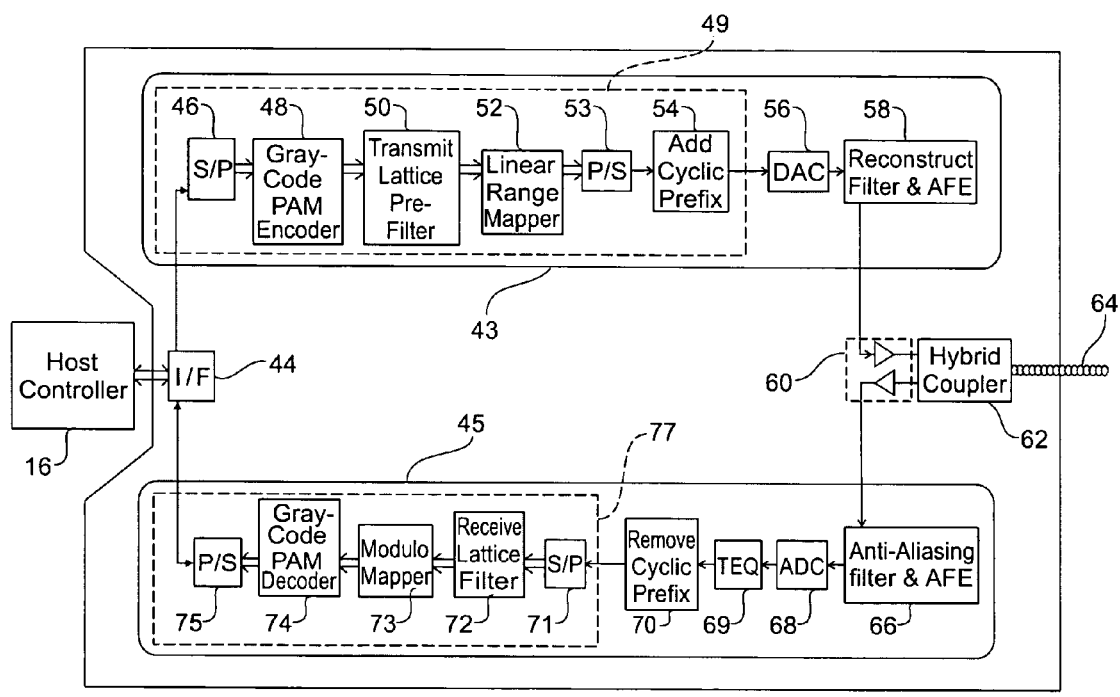
FIG. 2 is a functional block diagram of a modem according to an embodiment of the present invention.

FIG. 2 is a schematic block diagram for explaining a DSL modem according to a preferred embodiment of the present invention. For purposes of explanation, FIG. 2 depicts a number of functional modules. It will be realised however that in practice a computational means, in the form of an electronic processor executing a suitable firmware program stored in a memory device such as a ROM, would implement many of the functional modules.

Modem 42 includes a transmitter 43 and receiver 45 and communicates with a remote data transceiver, such as another modem of the same type, via a channel 64 that is typically a twisted pair telephone cable. For purposes of explanation a discrete-time channel model will be assumed. In this model a transmit symbol x comprises a time-domain vector of N transmit samples. The receive-symbol is given by $$y = Hf(x) + \eta \quad (1)$$

where H is the channel matrix, f(•) is a vector function representing clipping associated with the transmitter (particularly amplifier 60) and $\eta$ is independent, identically distributed zero-mean white gaussian noise with variance $\sigma^2$. In order to reduce inter-symbol interference a guard period of length greater than, or equal to, L samples is inserted between successive transmit-symbols where L is the delay-spread of the channel. As discussed in relation to the DMT modem of FIG. 1, sinusoidal-MCM techniques typically require that a cyclic prefix is transmitted during a guard period. A modem according to the present invention may either insert a cyclic prefix or zero-energy in order to save power. In the zero-energy guard period case y is (N+L)×1 and H is (N+L)×N Toeplitz. For a cyclic prefix, y is N×1 and H is N×N circulant. In either case, H has the following first column:

$$h_1 = (h_0, \ldots, h_L, 0, \ldots 0)^T \quad (2)$$

where $h_1$ is the $i^{th}$ discrete time coefficient of the finite-impulse response (FIR) channel, which models the combined effect of the reconstruction filter channel, anti-aliasing filter, analogue front ends and time domain equaliser.

The $i^{th}$ element of f(•) is:

$$f_i(x) = \begin{cases} a & \text{if } x_i > a, \\ -a & \text{if } x_i < -a, \\ x_i & \text{otherwise} \end{cases} \quad (3)$$

The channel matrix H, and hence the characteristics of the channel, are determined from time to time using conventional techniques during a "training" phase of operation of the modem as is known in the art.

Referring again to FIG. 2, serial-to-parallel converter 46 latches M-bit data blocks from interface 44 and divides each M-bit data block into N sub-sequences, each of length $B_i$ for $i=1, \ldots, N$. Each of the sub-sequences is binary sequence gray mapped by gray-code PAM encoder 48 and converted into a decimal integer $q_i$, where $0 \le q_i < 2B_i$. The data vector $q \in Z^N$ (with elements $q_i$) is "modulated" by lattice pre-filter 50 and linear range mapper 52 onto non-sinusoidal basis functions, or "carriers". Pre-filter 50 generates a vector z by modifying the (integer) data-vector q as follows:

$$z = VAq$$

Here VA is a pre-filtering matrix that is a basis for a transmit lattice $\Lambda$. The columns of VA are used as carriers for the data. Hence the term lattice MCM is appropriate for describing modulation schemes according to the present invention.

V and A are calculated from the channel matrix H by firstly performing a Gram-Schmidt (or QR decomposition) as follows:

$$H = QR = QDU \quad (5)$$

where $Q \in R^{N \times N}$ is an orthonormal matrix (i.e. $Q^T Q = I$), $D \in R^{N \times N}$ is diagonal and $U \in R^{N \times N}$ is upper triangular with 1's along the diagonal. Here the usual assumption is made that H has full column rank, which implies that the diagonal elements of D, namely $d_i$, are non-negative. If H has column rank n<N then the lower right N−n diagonal elements of D are set to zero. By virtue of the structure of U, it can be seen that det U=1. Note that this decomposition of H is always possible, even if H does not have full column rank.

Now, consider transmit-symbols of the form:

$$x = VAp \quad (6)$$

where $V=U^{-1}$, $A=\text{diag}(2^{-B_1}, 2^{-B_2}, \ldots, 2^{-B_N})$, and where p is a vector of integers (related to q as will be seen later). Note that V is upper triangular with 1's along the diagonal and det V=1. Taking (4) together with the channel decomposition (5), we have the desirable property that the columns of HV=QD form an orthogonal (but not orthonormal) basis for $R^N$.

Linear range mapper 52 processes the z data vector generated by transmit lattice pre-filter 50 to produce a vector x of N data symbols that is located within a clipping free region C, i.e. $x \in C$. Linear range mapper 52 generates x according to the formula $$x = z - Vk \quad (7)$$

where $k \in Z^N$ chosen so that $x \in C$. The elements of k are calculated iteratively. Iterative calculation is possible because V is upper triangular so that it is possible to start by finding the value of $k_N$ which ensures $|x_N| < \frac{1}{2}$, and then iterating backwards to find the other values in turn. More specifically, if $|x_i| < \frac{1}{2}$ for i>n, then we can force $|x_n| < \frac{1}{2}$, by subtracting the appropriate integer multiple of the $n^{th}$ column vector of V, namely $v_n$. It will be realised that not only is $x \in C$ but also $x \in \Lambda$. To see this, note that (6) and (7) give $$x = Vaq - Vk = VAp,$$

Where p is defined to be $q - A^{-1}k \in Z^N$ \quad (8)

It will be observed that $p \in Z^N$ since $q \in Z^N$, and $A^{-1}k \in Z^N$. The second property is known since $k \in Z^N$ and $A^{-1}=\text{diag}(2^{B_1}, 2^{B_2}, \ldots, 2^{B_N}) \in R^{N \times N}$. Finally, since VA is the basis for the transmit lattice $\Lambda$, and p is an integer-valued vector, we do indeed have $x \in \Lambda$.

Note that equation (8) effectively adds integer multiples of $2^{B_j}$ to $q_j$ (which is in the range $0 \leq q_j < 2B_j$, from above) to arrive at $p_j$. The result is that the mapping in (8) can be inverted by simply taking the modulo-$2^{Bj}$ division of each $p_j$. In the receiver the inverse of the mapping of equation (8) is carried out by modulo mapper 73.

After the transmit vector x has been generated by linear range mapper 52 a parallel-to-serial conversion is performed by converter 53 before a cyclic extension is inserted by module 54. The output from the cyclic extension module is processed by DAC 56 and thence conditioned by reconstruction filter and analog front end 58. The analog front end produces an analogue signal that is applied to channel 64, typically a twisted pair, via line driver amplifier 60 and hybrid coupler 62.

The arithmetic complexity of the coding process is dominated by the matrix calculation of z from q by (6) and x from z by (7). All other steps in the process (serial-to-parallel conversion, Gray-to-binary encoding, etc) are elementary logical operations.

Some observations will now be made that will assist in showing that (4) and (7) can be combined into a single operation and that even though they appear to be matrix calculations, the number of arithmetic operations required is in fact only O(N). This will be demonstrated for the zero-energy guard-period case although the inventors have also found that the same observations can be adapted for the cyclic-prefix case. The observations are as follows:

1) Provided $h[0] \neq 0$, H has full column rank.
2) H is banded with lower bandwidth L and upper bandwidth 0, hence $h_i^T h_j = 0$ if $j > i + L$.
3) The QR decomposition of H is unique for the case under consideration. Moreover, none of the diagonal elements of R are zero (as demonstrated in G. H. Golumb and C. F. van Loan, *Matrix Computations*, $2^{nd}$ ed. Baltimore: Johns Hopkins University Press 1989.)

4) It can be shown that the matrix R is banded with lower bandwidth and upper bandwidth L.
5) Since R is banded, U is also banded with the same bandwidths.
6) For the ith row of V, $\underline{v}_i$, we can write $$\underline{v}_i = e_i^T - \sum_{j=i+1}^{N} u_{ij} \underline{v}_j \quad (9)$$

where $e_i$ is the unit vector whose ith element is 1. This is a result of the fact that $V = U^{-1}$ and U is upper triangular with 1's on the diagonal.

7) The calculation of $\rho = Aq$ is O(N) since A is diagonal.
8) With $\kappa \equiv \rho - k$ it follows from (7) and (8) that $$x_i = \underline{v}_i \kappa$$

$$= e_i^T \kappa - \sum_{j=i+1}^{N} u_{ij} \underline{v}_j \kappa$$

$$= \kappa_i - \sum_{j=i+1}^{N} u_{ij} x_j$$

$$= \rho_i - k_i - \sum_{j=i+1}^{N} u_{ij} x_j$$

That is, the inventors have found that the functionality of the transmit lattice pre-filter 50 and the linear range-mapper 52 can be performed according to a relatively straightforward O(N) summation as follows:

$$x_i = \rho_i - k_i - \sum_{j=i+1}^{N} u_{ij} x_j \quad (10)$$

where $$\rho = Aq \quad (11)$$

A reduced complexity algorithm for computing x from q can now be seen to be O(N). Firstly, p is calculated in O(N) from (11). Secondly the $k_i$ and $x_i$ are calculated iteratively from i=N down to i=1 using (10). Each $k_i$ is chosen as that unique integer which makes $x_i \in [-\frac{1}{2}, \frac{1}{2})$, i.e. $k_i$ is set to the nearest integer of the value that is computed on the right-hand side of (10). Finally, it should be noted that the right hand side of (10) requires a number of arithmetic operations that are not dependent on N but rather on L, because of the banded nature of U. Hence, the overall number of arithmetic operations required to calculate x for transmission is O(N).

Figure 3:
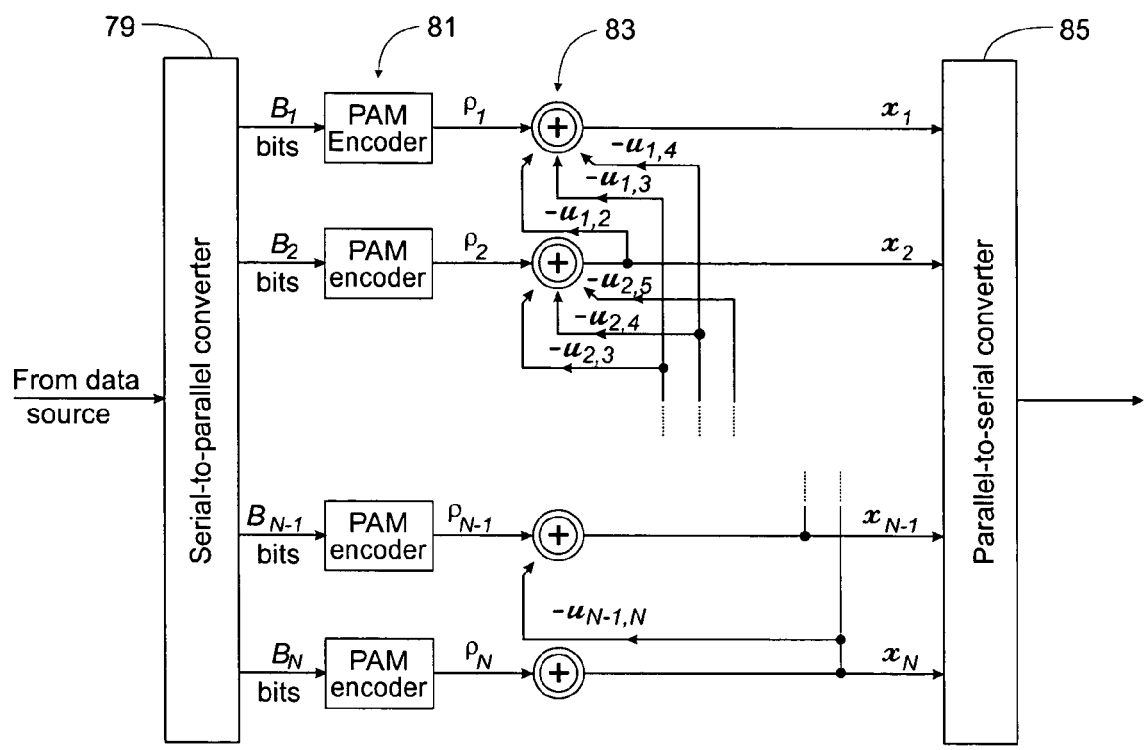
FIG. 3 is a diagram of a modulator according to an embodiment of the present invention.

FIG. 3 depicts a modulator structure, according to a preferred embodiment of the invention, that operates by implementing equation (10). The modulator of FIG. 3 may be used to implement functional blocks demarcated by dashed line 49 in FIG. 2. For purposes of illustration it is assumed that L=3. The modulator of FIG. 3 has some elements in common with vector coding since QR decomposition is central to its operation—the elements of the matrix U which appear in the feedback are derived directly from R. Serial-to-parallel converter 79 breaks up the incoming block of M bits into parallel channels of $B_i$ bits each. The PAM encoders produce the elements of the ρ vector as defined in equation (11).

The modulo adders and feedback paths of the modulator of FIG. 3 calculate the elements of x according to (10). It may be observed that the maximum number of inputs to an adder is L+1 in accordance with the banded structure of U.

The operation of receiver 45 will now be explained, again with reference to FIG. 2. Initially anti-aliasing filter and analog front end 66 receive an analog signal of the type generated by transmitter 43 over twisted pair 64. The analogue signal is received via hybrid coupler 62 and isolating amplifier 60.

The filtered analogue signal from front-end 66 is processed by analog-to-digital converter 68 to produce N+L sub-sequences where the L sub-sequences comprise the cyclic prefix. The signal from converter 68 is passed through time domain equaliser 69 and the cyclic prefix is removed by extension remover module 70. The remaining N sub-sequences are passed through serial-to-parallel converter 71 to produce an integer-valued vector p which is processed by receive lattice filter 72. The receive lattice filter performs the computation:

$$s = Q^T y = DAp + v \quad (12)$$

where DA is a basis for the receive-lattice, and $v = Q^T \eta$ is independent, identically distributed zero-mean Gaussian with variance $\sigma^2$.

Modulo mapper 73 computes the maximum likelihood estimate q̂ of q from the s vector output generated by lattice filter 72. Gray-code PAM decoder 74 decodes the q̂ vector to produce N data subsequences which are then processed by parallel-to-serial converter 75 to reconstruct the original M-bit data block.

As DA is a basis for the receive lattice and since both D and A are diagonal matrices, receiver detector 74 is able to estimate the received $\hat{p}_i$ of $p_i$ according to the following computation:

$$\hat{p}_i = \text{round}(2^{B_i} s_i / d_i)$$

and "round" is a function which yields a nearest integer to its argument.

The maximum-likelihood estimate q̂ of q is computed by calculating the positive remainder of the division of q̂ by $2^{B_i}$. Finally, gray-code converter 76 converts the $q_i$ integers to binary codes which are latched in output buffer 39 for retrieval by digital interface 44.

Although it initially appears that the computations that lattice filter 72 must perform would require computations of $O(N^2)$, the inventors have found that the computation is in fact only O(N) due to their having made the following observations:

1) We can write $Q = HR^{-1}$ and so $s = R^{-T}H^T y$
2) The calculation of $\mu = H^T y$ requires only O(N) operations because H is banded.
3) With $T = R^{-1}$, observe that, similar to (9), $$t_i = \frac{1}{r_{ii}} e_i - \sum_{j=1}^{i-1} r_{ji} t_j$$

4) As a result, we have $s = T^T \mu$ and $$s_i = t_i^T \mu = \frac{1}{r_{ii}} e_i^T \mu - \sum_{j=1}^{i-1} r_{ji} t_j^T \mu = \frac{1}{r_{ii}} \mu_i - \sum_{j=1}^{i-1} r_{ji} s_j \quad (13)$$

where $$\mu = H^T y \quad (14)$$

It can now be observed that the elements $s_i$ of s can be computed from μ starting at i=1 up to i=N according to (13). Moreover, evaluation of the right hand side of (13) requires the summation of no more than L elements because R is banded. Since the amount of computation required to determine each element of s from μ does not depend on N, and because calculation of μ from y is O(N) it will be realised that the entire decoding process is only O(N).

Note also that since the demodulation iteration starts at i=1, it is not necessary at the receiver to wait for an entire symbol before the first decoded outputs are produced from it. After the first L+1 samples of a symbol are received, $\mu_1$ becomes available. The first decoded output can then be produced and thereafter a new output can be produced as each subsequent sample arrives from ADC 68.

It may also be noted that the memory required for both encoding and decoding is also O(N), since it is only necessary to store the non-zero coefficients of H and R (and therefore also U), banded matrices whose bandwidths are independent of N.

Figure 4:
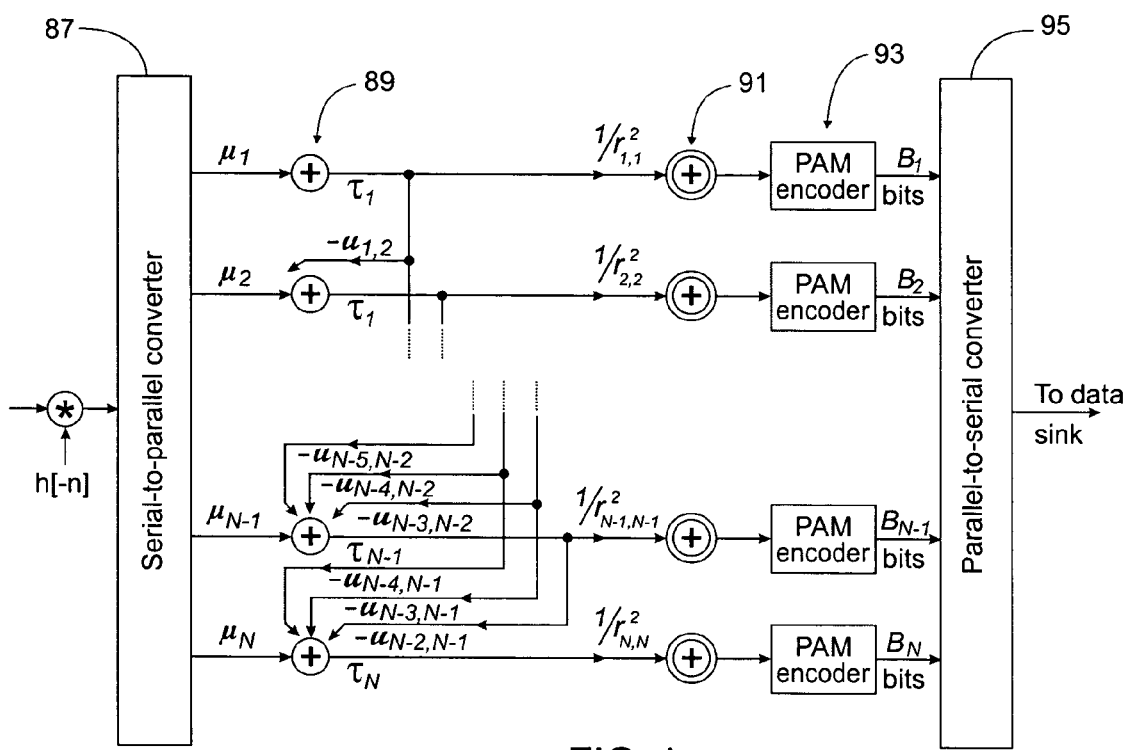
FIG. 4 is a diagram of a demodulator according to an embodiment of the present invention.

A demodulator structure in accordance with equation (13) is shown in FIG. 4. The demodulator of FIG. 4 may be used to implement functional blocks surrounded by dashed line 77 in FIG. 2. Initially digitised data samples are passed through a matched filter, i.e., convolution is performed with h[−n]. Then, the filtered samples are grouped according to their symbol and passed through a serial-to-parallel converter 79, from which is output the elements of μ as defined in (14). Note that this step involves throwing away L out of every N+L samples at the output of the matched filter. That is, those samples from the matched filter that 'straddle the boundary' between symbols are not further used in the demodulation process.

Adders 89 and associated feedback paths compute the vector $\tau = U^{-T} \rho$ where $$\tau_i = \mu_i - k_i - \sum_{j=1}^{i-1} u_{ji} \tau_j \quad (15)$$

It may be observed that $D^{-2} \tau = Aq - k + D^{-2} v$. Accordingly, $\tau_i / r^2_{ii}$ are passed through modulo elements 91 before PAM modules 93 in order to decode the bits decoded in q. Parallel-to-serial conversion is then performed by converter 95.

As reported in their paper *A Low-Complexity Lattice-Based Low-Par Transmission Scheme for DSL Channels* published in IEEE Transactions on Communications, Vol. 52, No. 5, May 2004, the inventors have undertaken realtime digital signal processing (DSP) implementations to compare the performance of prior art DMT relative to an embodiment of the presently described lattice MCM. The DSP implementations were undertaken on Texas Instruments TMS320C6201 chips for an N=64, L=4 system. Under the same code-optimization conditions the inventors found that the DMT (encoder, decoder) cycle counts were (16757, 19238), whereas the lattice scheme as (3915, 8738). That is, the practical complexity of DMT was found to be a factor of (4.28, 2.20) greater than for the lattice scheme even for the small block length that was tested.

Recently an extension of vector coding and Tomlinson-Harashima precoding has been described in an article entitled *Vectored Transmission for Digital Subscriber Line Systems* (IEEE J. Sel. Areas Comms., vol. 20. no. 5. pp 1085-1103 2002). The technique described therein is designed to effect crosstalk cancellation in xDSL environments. The 'multi-user precoding scheme' is used in conjunction with DMT. Crosstalk is cancelled on a 'per-tone' basis. If the complex vector x is used to represent the transmitted amplitude and phase of each user on a given tone and the complex vector y is used to represent the received amplitude and phase, then $$y = Hx + \eta \quad (16)$$

represents the effect of the multiple-input multiple output (MIMO) crosstalk channel for that tone. Of course, the elements of H are now also complex and, furthermore, H does not have a circulant or Toeplitz structure in general. Rather than use a QR decomposition of H for vector coding, as is described in the previously referenced article, according to an embodiment of the present invention, the decomposition is applied instead to its Hermitian transpose $H^*$. A precoding scheme similar to the one described herein is used on the complex QAM inputs to limit the increase in transmitted power. However, it is not aimed low PAR transmission and, except where H is sparse, has a computational cost that grows with the square of the matrix dimension.

For MIMO transmission that is coordinated at the transmitter and receiver, it should be noted that the MCM techniques described thus far may be easily generalised to encompass the scenario in bonded DSL where more than one twisted pair is used in parallel to communicate between the remote user and central office.

Given C channels, the joint transmission over all channels can again be characterised by equation (1), where now: $x = (x_1^T, \ldots, X_N^T)^T$ itself consists of subvectors $x_1, \ldots, x_N$. Each $x_i$ is now of length C and contains the time domain amplitudes at each of the transmitters at time i. The vector y is similarly redefined. We define L to be the maximum length of a channel impulse response or cross-channel impulse response and, again, it determines the length of the intersymbol space. When zeros are inserted between symbols, the transmit vector x is then of length CN, the receive vector y is of length C(N+L) and the channel response matrix H is a C(N+L)×CN block Toeplitz matrix. The first column of blocks of H can be written $H_0, \ldots, H_L, 0 \ldots 0$. Each $H_i$ is a C×C matrix and relates the contribution to the output at each of the receivers at any time instant to the samples that were transmitted i time steps previously from each transmitter.

The block Toeplitz nature of the H matrix means that the analysis of modulation and demodulation complexity that produced equations (10) and (13) may be applied to demonstrate that a symbol can be modulated and demodulated for coordinated MIMO transmission in O(N) arithmetic operations and that the memory requirement is also O(N). Moreover, analogous modulator and demodulator structures to those in FIGS. 3 and 4 may be used. Finally it may be observed again, that no major difficulties are introduced by the use of cyclic prefixing in place of zeroing.

In the preceding description reference is made to mathematical operations such as matrix and vector multiplication. It will be realised by those skilled in the art that such operations are implemented by means of electronic hardware and involve the storage and manipulation of electronic signals in solid-state devices such as one or more digital processors. It be further realised that the invention encompasses a software product, such as a magnetic or optical disk or suitable memory chip, containing instructions for a processor to execute computations of the type described above.

The embodiments of the invention described herein are provided for purposes of explaining the principles thereof, and are not to be considered as limiting or restricting the invention since many modifications may be made by the exercise of skill in the art without departing from the scope of the invention as defined by the following claims.

We claim:

1. A digital communications apparatus for processing a data vector, said apparatus including a transmitter for communicating with a receiver across a channel having channel characteristics, said apparatus including:
   at least one computational processor;
   at least one memory device storing instructions, which, when executed by the at least one computational processor cause the apparatus to:
   compute a transmit vector from the data vector and from values defining a basis for a transmit lattice, said transmit lattice defining a set of transmit symbols of length N and related to an orthogonal receive lattice by the channel characteristics, and
   perform the computation according to an algorithm of no more than order N complexity.

2. An apparatus according to claim 1, wherein the instructions further cause the apparatus to determine the channel characteristics.

3. An apparatus according to claim 2, wherein the instructions further cause the apparatus to calculate the values defining the basis for the transmit lattice.

4. An apparatus according to claim 1, wherein the instructions further cause the apparatus to calculate the values defining the basis for the transmit lattice in order that the transmit symbols avoid clipping by the transmitter.

5. An apparatus according to claim 1, wherein the instructions further cause the apparatus to determine the basis for the transmit lattice from a decomposition of a channel matrix of the channel characteristics.

6. An apparatus according to claim 1, wherein the instructions further cause the apparatus to compute the transmit lattice points on the basis of the channel characteristics and a receive lattice having points spaced to correspond to a desired bit-error-rate (BER).

7. An apparatus according to claim 1 further comprising a converter configured to convert binary code data into the data vector.

8. An apparatus according to claim 7 wherein the converter comprises a Gray-code converter.

9. An apparatus according to claim 1 including a receiver to process a receive data vector.

10. An apparatus according to claim 9 wherein the receiver is configured to compute a filtered vector from the receive data vector and values defining a basis for the orthogonal receive lattice.

11. An apparatus according to claim 10, wherein the receiver is configured to compute the filtered vector according to an algorithm of order N complexity.

12. An apparatus according to claim 11, wherein the receiver is further configured to process the filtered vector to determine a maximum-likelihood estimate of the data vector.

13. An apparatus according to claim 12 further including a converter configured to convert elements of the maximum-likelihood estimate of the data vector to a binary code format.

14. An apparatus according to claim 13 wherein the converter comprises a binary-to-Gray-code converter.

15. A method for operating a processor of a digital communications apparatus to transmit digital data across a channel having channel characteristics, the method including the steps of:
- calculating, by the processor, a basis for a transmit lattice, the transmit lattice defining a set of transmit symbols of length N and related to an orthogonal receive lattice by the channel characteristics,
- wherein the calculation is performed by the processor according to an algorithm of no more than order N complexity.

16. A method according to claim 15, including calculating the receive lattice as a function of a desired bit-error-rate (BER).

17. A method according to claim 16, including calculating the basis for the transmit lattice in order that clipping is avoided in a transmitter operated by the digital communications apparatus.

18. A method for operating a processor of a digital communications apparatus for transmitting digital data across a channel characterised by a channel matrix H, the method including the steps of:
- a) instructing the processor to divide the digital data into N subsequences each of length $B_i$ for i=1, ..., N;
- b) instructing the processor to form a data vector q from the N subsequences;
- c) instructing the processor to determine a basis $U^{-1}A$ for a transmit lattice where $U^{-1}$ is an upper triangular matrix determined from a decomposition of the channel matrix and $A=\text{diag}(2^{-B1}, 2^{-B2}, \ldots, 2^{-BN})$; and
- d) instructing the processor to iteratively calculate a vector x of transmit signals according to the equation $$x_i = \rho_i - \sum_{j=i+1}^{N} u_{ij} x_j$$

where $\rho = Aq$.

19. A method according to claim 18 including instructing the processor to calculate $x_i$ in each iteration of step d) so that x falls within a pre-determined transmit space comprising a region of N-dimensional space.

20. A method according to claim 19 including selecting the pre-determined region of transmit space to avoid clipping.

21. A method according to claim 18 including steps for instructing the processor to process a receive vector y, said steps including:
- e) instructing the processor to calculate a matrix R from the channel matrix H where H=QR and Q is an orthonormal matrix; and
- f) instructing the processor to iteratively calculate a filtered receive vector s according to the equation $$s_i = \frac{1}{r_{ii}} \mu_i - \sum_{j=1}^{i-1} r_{ji} s_j$$

where $\mu = H^T y$.

22. A method according to claim 21 further including instructing the processor to calculate a maximum likelihood estimate $\hat{q}$ of q by calculating the positive remainder of the division of $\hat{p}_i$ by $2^{Bi}$ where $\hat{p}_i=\text{round}(2^{Bi} s_i/d_i)$ and "round" is a function which yields a nearest integer to its argument.

23. A method according to claim 22 including converting the q to estimates of the digital data of step a) by binary-to-Gray-code conversion.

24. A communications apparatus including a software or firmware product in the form of a memory device containing instructions readable by a processor of the communications apparatus to transmit digital data across a channel having channel characteristics the instructions including:
- instructions executable by the processor to calculate a basis for a transmit lattice, the transmit lattice defining a set of transmit symbols of length N and related to an orthogonal receive lattice by the channel characteristics,
- wherein the calculation is performed by the processor according to an algorithm of no more than order N complexity.

25. A communications apparatus according to claim 24 wherein the instructions include, instructions to calculate the receive lattice as a function of a desired bit-error-rate (BER).

26. A communications apparatus according to claim 24 wherein the instructions include, instructions to calculate the basis of the transmit lattice in order that clipping is avoided in a transmitter operated by the communications apparatus.

27. A communications apparatus according to claim 24 wherein the instructions to calculate the basis for the transmit lattice as a function of the channel characteristics and the receive lattice having predetermined dimensions include:
- a) instructions for the processor to divide the digital data into N subsequences each of length $B_i$ for i=1, ..., N;
- b) instructions for the processor to form a data vector q from the N subsequences;
- c) instructions for the processor to determine a basis $U^{-1}A$ for a transmit lattice where $U^{-1}$ is an upper triangular matrix determined from a decomposition of the channel matrix and $A=\text{diag}(2^{-B1}, 2^{-B2}, \ldots, 2^{-BN})$; and
- d) instructions for the processor to iteratively calculate a vector x of transmit signals according to the equation $$x_i = \rho_i - \sum_{j=i+1}^{N} u_{ij} x_j$$

where $\rho = Aq$.

28. A communications apparatus according to claim 27 wherein said instructions include, instructions for the processor to calculate $x_i$ in each iteration of step d) so that x falls within a pre-determined transmit space comprising a region of N-dimensional space.

29. A communications apparatus according to claim 28 wherein said instructions include, instructions for the processor to select the pre-determined region of transmit space to avoid clipping.

30. A communications apparatus according to claim 27 wherein said instructions include:
- e) instructions for the processor to calculate a matrix R from the channel matrix H where H=QR and Q is an orthonormal matrix; and f) instructions for the processor to iteratively calculate a filtered receive vector s according to the equation $$s_i = \frac{1}{r_{ii}}\mu_i - \sum_{j=1}^{i-1} r_{ji}s_j$$

where $\mu=H^T y$ and y comprises a receive vector.

31. A communications apparatus according to claim 30 further including instructions for the processor to calculate a maximum likelihood estimate $\hat{q}$ of q by calculating the positive remainder of the division of $\hat{p}_i$ by $2^{B_i}$ where $\hat{p}_i=\text{round}(2^{B_i}s_i/d_i)$ and "round" is a function which yields a nearest integer to its argument.

32. A communications apparatus according to claim 31 including instructions for the processor to convert the q to estimates of the digital data of step a) by binary-to-Gray-code conversion.

* * * * *

UNITED STATES PATENT AND TRADEMARK OFFICE
CERTIFICATE OF CORRECTION

PATENT NO. : 7,876,838 B2
APPLICATION NO. : 10/869066
DATED : January 25, 2011
INVENTOR(S) : Ian Vaughan Clarkson and Iain Bruce Collings Page 1 of 1

It is certified that error appears in the above-identified patent and that said Letters Patent is hereby corrected as shown below:

Title page, insert item 73 as follows: -- [73] Assignees: "The University of Sydney, Australia" and "The University of Queensland, Australia"--.

Claim 32, col. 16, line 6, "convert the q" should read -- convert the $\hat{q}$ .--.

Signed and Sealed this
Twenty-sixth Day of July, 2011

David J. Kappos
*Director of the United States Patent and Trademark Office*